US011554619B2

(12) United States Patent
Corghi

(10) Patent No.: US 11,554,619 B2
(45) Date of Patent: Jan. 17, 2023

(54) VEHICLE WHEEL SERVICE APPARATUS

(71) Applicant: NEXION S.p.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 632 days.

(21) Appl. No.: 16/713,215

(22) Filed: Dec. 13, 2019

(65) Prior Publication Data

US 2020/0189333 A1 Jun. 18, 2020

(30) Foreign Application Priority Data

Dec. 18, 2018 (IT) .......................... 102018000020116

(51) Int. Cl.
*B60C 25/05* (2006.01)
*B60C 25/00* (2006.01)
(Continued)

(52) U.S. Cl.
CPC ........ *B60C 25/0548* (2013.01); *B60C 25/007* (2013.01); *B60C 25/0515* (2013.01);
(Continued)

(58) Field of Classification Search
CPC .............. B60C 25/0548; B60C 25/007; B60C 25/0515; B60C 25/0518; B60C 25/0521; B60C 25/138; G01M 1/045; G01M 1/326
See application file for complete search history.

(56) References Cited

U.S. PATENT DOCUMENTS

| 3,168,130 A | * | 2/1965 | Turpin | .................. | B60C 25/132 |
| | | | | | 157/1.28 |
| 5,385,045 A | | 1/1995 | Mannen et al. |
| | | (Continued) |

FOREIGN PATENT DOCUMENTS

| CN | 201107156 Y | 8/2008 |
| EP | 0058860 B1 * | 4/1986 ............ G01M 1/045 |
| | (Continued) |

OTHER PUBLICATIONS

Italy Search Report dated Sep. 2, 2019, for Application IT201800020116).

*Primary Examiner* — David B. Thomas
(74) *Attorney, Agent, or Firm* — The Dobrusin Law Firm, P.C.

(57) ABSTRACT

A vehicle wheel service apparatus that includes: a frame; a plurality of working tools, connected to the frame and movable to perform operations for mounting and/or demounting the tyre relative to the wheel rim; a shaft driven by an actuator rotationally about a longitudinal axis and connectable to the rim; a measuring system for generating vibration signals representing vibrations of the shaft produced by wheel imbalances; a control unit, connected to the measuring system to receive the vibration signals; a support device, connected to the frame and movable between an activated position, where it encircles the shaft while still allowing it to rotate, and a deactivated position, where it is spaced from the shaft; a connector, movable between a working position, where it mechanically connects the measuring system to the frame, and a rest position, where the measuring system is mechanically disengaged from the frame.

20 Claims, 9 Drawing Sheets

(51) Int. Cl.
*B60C 25/138* (2006.01)
*G01M 1/04* (2006.01)
*G01M 1/32* (2006.01)
*G01M 17/02* (2006.01)

(52) U.S. Cl.
CPC ...... *B60C 25/0518* (2013.01); *B60C 25/0521* (2013.01); *B60C 25/138* (2013.01); *G01M 1/045* (2013.01); *G01M 1/326* (2013.01); *G01M 17/022* (2013.01)

(56) References Cited

U.S. PATENT DOCUMENTS

| 10,059,158 B2 | 8/2018 | Magnani |
| 2011/0042575 A1 | 2/2011 | Ishii et al. |

FOREIGN PATENT DOCUMENTS

| EP | 3160777 A1 | 5/2017 | |
| WO | WO-2011101006 A1 * | 8/2011 | ........... B60C 25/056 |

* cited by examiner

VEHICLE WHEEL SERVICE APPARATUS

FIELD

This invention relates to a wheel service apparatus;; that is, it has for an object an apparatus for servicing a vehicle wheel.

BACKGROUND

Wheel service apparatuses are used to perform particular maintenance and checking operations on vehicle wheels such as, for example, but not limited to, demounting and mounting the tyre from/to the rim, balancing the wheels and diagnosing rims and/or tyres.

Known in the prior art of wheel service equipment are solutions where each service is performed by a specific machine such as, for example, tyre changers and balancing machines.

Wheel service machines of this kind, however, are very cumbersome. To perform the main services on the wheel, therefore, a user requires a great deal of space. As a result, there is now a real need for machines which perform these same functions while occupying less workshop space.

Furthermore, most of the time, these wheel services are performed in series and much time is wasted to unload the wheel from one machine and load it onto another. Also known in the prior art of wheel service equipment are solutions that combine tyre changing and balancing operations in a single machine. Combining these two services presents some difficulties, however. To mount and demount a tyre to and from a rim, the machine shaft must turn slowly while transmitting a high drive torque. Conversely, in the case of balancing, the machine shaft must turn very fast while transmitting a low drive torque. In some prior art solutions, the shaft is driven selectively by a first or a second motor, depending on the type of work to be done. These solutions are described, for example, in document IT1067852B, where a clutch system selectively engages a first or a second motor.

These solutions are relatively unreliable, however. In effect, when the motor transmits a high torque, the links to the measuring system of the balancing machine discharge the forces on the measuring system itself and the measuring system, being very fragile, is easily damaged. Moreover, even when the damage is not irreparable, the measuring system might lose its calibration settings, leading to unacceptably imprecise measurements.

Other solutions are known where the direction of the forces due to imbalance and the direction of the forces due to mounting and demounting operations were taken into consideration to design a structure capable of being more flexible in the direction of the imbalance forces and stiffer in the direction of the forces due to demounting. Solutions of this kind are described, for example, in document EP2711206B1.

Other examples of solutions that combine a balancer with a tyre changer are provided by the patent documents US55385045A, EP3160777A1, US2011/042875A1 and CN201107156Y.

In these solutions, too, however, the deformation induced by the demounting forces on the imbalance measuring system are not negligible and the probability that the sensors lose their calibration settings or are damaged remains high.

SUMMARY

This invention has for an aim to provide a wheel service apparatus and a method for performing a wheel service which overcome the above mentioned disadvantages of the prior art.

This aim is fully achieved by the wheel service apparatus and method of this disclosure as characterized in the appended claims.

According to one aspect of it, this disclosure provides a wheel service apparatus for a vehicle wheel including a tyre mounted on a rim.

It should be noted that in the context of this document, the term "wheel" is used to denote a tyred wheel, including the rim and the tyre mounted thereon. The apparatus comprises a frame. The apparatus comprises a plurality of working tools. The tools of the plurality of tools are connected to the frame. The tools of the plurality of tools are movable to perform operations for mounting and/or demounting the tyre relative to the wheel rim and/or for diagnosing the wheel and/or for balancing the wheel. The apparatus comprises a shaft. The shaft rotates about a longitudinal axis. The shaft is configured to be connected, at a first end of it, to the rim of the vehicle wheel. In an embodiment, the apparatus comprises an actuator. The actuator is operatively connected to the shaft to set it in rotation. In an embodiment, the apparatus comprises a plurality of actuators, acting in conjunction with each other and/or selectively connected to the shaft to set it in rotation.

In an embodiment, the shaft includes a first portion and a second portion. In an embodiment, the first portion is configured to rotate inside the second portion. In an embodiment, the first portion is connected to the second portion by a screw transmission system which is configured to convert the rotation of the first portion of the shaft into a translation of the second portion of the shaft along the axis of maximum extension of the shaft. That way, the apparatus modifies the position of a damping chuck and is able to clamp the wheel on the shaft in order to carry out the necessary operations.

In an embodiment, the apparatus comprises a measuring system. The measuring system is configured to generate vibration signals representing vibrations of the shaft produced by imbalances of the wheel by effect of its rotation about the longitudinal axis of the shaft itself. The measuring system comprises a plurality of sensors configured to convert a mechanical vibration into the vibration signal, that is, an (electric) signal representing vibrations of the shaft.

In an embodiment, the apparatus comprises a control unit. The control unit is connected to the measuring system to receive the vibration signals, In an embodiment, the apparatus comprises a support device. The support device is connected to the frame. The support device is movable between an activated position, where it encircles the shaft while still allowing it to rotate, and a deactivated position, where it is spaced from the shaft.

In an embodiment, the apparatus comprises a connector. The connector is movable between a working position, where it (mechanically) connects the measuring system to the frame, and a rest position, where the measuring system is (mechanically) disengaged from the frame.

Through the support device and the connector, the apparatus is able to isolate the measuring system during operations involving greater stresses. In effect, when the stresses on the wheel are high, the support device is subjected to all the stresses which the shaft is subjected to, whilst the measuring system is disengaged and thus in a "floating"

condition so it is not subjected to stresses that could cause it to lose its calibration settings or even to be permanently damaged.

In an embodiment, the control unit is configured to automatically set the support device at its activated position when the connector is at its rest position. In an embodiment, the control unit is configured to automatically position the support device at its deactivated position when the connector is at the working position. By "automatically" is meant an automatic control whereby a control logic previously saved in the control unit allows the control unit, by itself and without human intervention, to send drive signals to the connector and/or to the support device to vary their positions as a function of the positions of the connector and/or of the support device themselves.

In an embodiment, the apparatus is movable between a tyre changer configuration, where it is set to perform operations for mounting and/or demounting the tyre relative to the rim, and a balancer configuration, where it is set to detect and correct wheel imbalances, if any, when the wheel is set in rotation about the longitudinal axis.

In an embodiment, the control unit is configured to receive an activation command. The control unit is configured to instruct the support device to move to the activated position or to the deactivated position as a function of the activation command. The control unit is configured to instruct the connector to move to the working position or to the rest position as a function of the activation command.

In an embodiment, the control unit is configured to receive a command to activate the tyre changer configuration. In an embodiment, the control unit is configured to instruct the support device to move to the activated position in response to receiving the command to activate the tyre changer configuration. In an embodiment, the control unit is configured to instruct the connector to move to the rest position in response to receiving the command to activate the tyre changer configuration.

The expression "command to activate the tyre changer configuration" is used to mean any command entered by a user of the apparatus and interpreted by the control unit as a will to change the configuration of the apparatus until reaching the tyre changer configuration.

In an embodiment, the command to activate the tyre changer configuration comprises a command to activate the support device and a command to deactivate the connector.

In an embodiment, the control unit is configured to receive the command to activate the support device. The control unit is configured to move the support device to the activated position in response to receiving the command to activate the support device. In an embodiment, the control unit is configured to instruct the connector to move to the rest position in response to receiving the command to activate the support device. In this embodiment, the command to activate the tyre changer configuration is a command to activate the support device. More specifically, in this embodiment, the control unit is programmed to automatically generate the command to deactivate the connector in response to the command to activate the support device.

In this disclosure, the term "tyre changer configuration" is also identified under the term "second operating configuration".

In an embodiment, the control unit is configured to receive a command to activate the balancer configuration. In an embodiment, the control unit is configured to instruct the connector to move to the working position in response to receiving the command to activate the balancer configuration. In an embodiment, the control unit is configured to instruct the support device to move to the deactivated position in response to receiving the command to activate the balancer configuration.

The expression "command to activate the balancer configuration" is used to mean any command entered by a user of the apparatus and interpreted by the control unit as a will to change the configuration of the apparatus until reaching the balancer configuration.

In an embodiment, the command to activate the balancer configuration comprises a command to activate the connector and a command to deactivate the support device.

In an embodiment, the control unit s configured to receive the command to activate the connector. The control unit is configured to move the connector to the working position in response to receiving the command to activate the connector. In an embodiment, the control unit is configured to instruct the support device to move to the deactivated position in response to receiving the command to activate the connector. In this embodiment, the command to activate the balancer configuration is a command to activate the connector. More specifically, in this embodiment, the control unit is programmed to automatically generate the command to activate the connector in response to the command to deactivate the support device.

In this disclosure, the term "balancer configuration" is also identified under the term "first operating configuration".

The apparatus comprises a user interface configured to allow the user to send to the control unit the command to activate the tyre changer configuration and/or the command to activate the balancer configuration. In an embodiment, the user interface may be a touch screen with a selection box for selecting each configuration the apparatus may be set to. For example, the screen might include a selection box for selecting the tyre changer configuration and a selection box for selecting the balancer configuration. In an embodiment, the user interface may be a switch having two stable positions, each corresponding to one of the two configurations of the apparatus (tyre changer or balancer).

In an embodiment, the user interface is configured to allow the user to send to the control unit the command to activate the support device and/or the command to activate the connector.. In an embodiment, the user interface might be a pedal. In an embodiment, the pedal is configured to allow controlling the power supply of a corresponding actuator of the support device and/or of the connector.

In an embodiment, the control unit is configured to detect the position of the support device. In an embodiment, the control unit is configured to detect the position of the connector. This embodiment allows the control unit to check whether the connector and/or the locking device are effectively at the correct position, that is to say, at the position determined by the drive signals sent by the control unit.

The automatic check allows reducing to a minimum the damage to the apparatus following human errors. In effect, if a user forgets to activate or deactivate the support device and/or the connector, the control unit is able to automatically make up for the error.

In other embodiments, the control unit is configured to receive working data from a user interface. The control unit is configured to change the position of the connector and/or of the support device as a function of the working data. In an embodiment, the control unit is also configured to alert a user who enters potentially incorrect working data. In effect, if an input command, corresponding to the working data, does not coincide with an automatic command, calculated by the control unit based on the control logic, the control unit is configured to alert the user before proceeding with the operations activated by the input command.

In an embodiment, the support device comprises a bushing. The bushing surrounds the shaft. The bushing is configured to rotate with the shaft in the absence of radial forces which press it against the shaft. In an embodiment, the bushing is connected to the shaft by a ball plunger press fit.

The support device comprises a locking device which is connected to the frame. In an embodiment, the locking device is movable between a rest position, corresponding to the deactivated position of the support device, where it is clear of the bushing, and a working position, corresponding to the activated position of the support device, where it is engaged with the bushing in order to support the shaft.

In other embodiments, the apparatus does not involve use of a bushing. In these embodiments, the locking device comprises a contact element. At the activated position of the support device, the contact element is in contact with the shaft. At the deactivated position of the support device, the contact element is clear of the shaft. In an embodiment, the contact element is a radial bearing. In an embodiment, the support device comprises a first clamp. The first clamp comprises a pair of jaws configured to grip and lock the shaft. In an embodiment, one semicircular half of the radial bearing (of the contact element) is connected to one jaw of the pair of jaws, while the other semicircular half of the radial bearing is connected to the other jaw of the pair of jaws. Thus, when the pair of jaws closes round the shaft, the two semicircular halves reassemble the radial bearing, allowing the shaft to rotate while withstanding radial forces, if any. This embodiment avoids the need for a bushing rotating with the shaft with the support device at the deactivated position.

In an embodiment, the support device rests on the frame. In an embodiment, the support device rests on the frame in at least two support zones. The two support zones are opposite to each other relative to the shaft.

That way, the flexural strain on the support device is considerably reduced because one arm of the bending moment is reduced.

In an embodiment, the shaft is movable between a first operating configuration, where it is perpendicular to the direction of the weight force, and a second operating configuration, where it is parallel to the direction of the weight force. The mobility of the shaft makes it possible to select the configuration that is most suitable for a particular service operation. The first operating configuration also allows mounting the wheel on the shaft more easily.

According to one aspect of it, this disclosure intends protecting a wheel service apparatus for a vehicle wheel including a tyre mounted on a rim, comprising:

a frame;

a plurality of working tools, connected to the frame and movable to perform operations for mounting and demounting the tyre relative to the rim;

a shaft which rotates about a longitudinal axis and which is configured to be connected, at a first end of it, to the rim of the vehicle wheel;

an actuator, operatively connected to the shaft to set it in rotation;

a measuring system, configured to generate vibration signals representing vibrations of the shaft produced by imbalances of the wheel by effect of the rotation of the shaft itself;

a control unit, connected to the measuring system to receive the vibration signals; wherein the shaft is movable between a first operating configuration, where it is perpendicular to the direction of the weight force, and a second operating configuration, where it is parallel to the direction of the weight force.

In an embodiment, the apparatus comprises a selecting actuator. The selecting actuator is configured to move the shaft from the first to the second configuration and vice versa. The selecting actuator may be a rotary actuator or a reciprocating actuator.

In an embodiment, in the first operating configuration, the connector is at the working position and the support device is at the deactivated position. Thus, in the first operating configuration (balancer configuration), the measuring system is connected to the frame of the apparatus so that it senses the stresses applied on the shaft as a result of imbalance, and the support device is disengaged from the shaft so that the stresses affect only the detection system, thereby increasing the sensitivity of the measurement. In an embodiment, in the second operating configuration, the connector is at the rest position and the support device is at the activated position. Thus, in the second operating configuration (tyre changer configuration), the measuring system is disengaged from the frame of the apparatus and the support device supports the shaft and receives the stresses therefrom. That way, the measuring system is isolated from the stresses transmitted to the shaft.

In an embodiment, the apparatus comprises an additional actuator. The additional actuator is operatively connectable to the shaft to set it in rotation. In an embodiment, the actuator is configured to provide rotation speeds and drive torques falling within a first range of speeds and a first range of drive torques. In an embodiment, the additional actuator is configured to provide rotation speeds and drive torques falling within a second range of speeds and a second range of drive torques. In an embodiment, a minimum value of the first range of speeds is greater than a maximum value of the second range of speeds. In an embodiment, a minimum value of the first range of speeds is greater than a maximum value of the second range of speeds.

This allows the shaft to be selectively driven as a function of the specific service to be carried out on the wheel. More specifically, in an embodiment, the actuator is configured to drive the shaft in the first operating configuration (balancer configuration) and the additional actuator is configured to drive the shaft in the second operating configuration (tyre changer configuration).

In an embodiment, the apparatus comprises a clutch device. The clutch device is movable between an activated position, where the shaft is engaged with the additional actuator, and a deactivated position, where the shaft is disengaged from the additional actuator. In an embodiment, when the connector is at the rest position, the clutch device is at the activated position. In an embodiment, when the connector is at the working position, the clutch device is at the deactivated position.

In an embodiment, the apparatus comprises a reconfiguring actuator, configured to move the shaft (the apparatus) from the first operating configuration to the second operating, configuration and vice versa. In an embodiment, the reconfiguring actuator comprises a cylinder, connected to the frame, and a piston, connected to the measuring system through a selective clamp (by way of a non-limiting example, a clamping slot). In an embodiment, the selective clamp is movable between a working position, where the piston is connected to the measuring system, and a rest position, where the piston is disengaged from the measuring system. In an embodiment, the selective damp is at the working position with the shaft in the first operating configuration (with the connector at the working position and the support device at the deactivated position). In an embodiment, the selective clamp is at the rest position with the shaft in the second operating configuration (with the connector at the rest position and the support device at the activated position).

In an embodiment, the connector comprises a pin. The pin is linked to the measuring system. In an embodiment, the connector comprises a coupling bushing. In an embodiment, the coupling bushing is a tapered roller. The tapered roller is keyed to the pin (that is, rotates around it, constrained in rotation therewith). The tapered roller is associated with a respective frame slot. In an embodiment, the frame slot has a tapered inside wall. The coupling bushing is movable relative to the pin along a direction of maximum extension of the pin, between a contact position, corresponding to the working position of the connector, where the coupling bushing is in contact with the respective frame slot, and a detached position, corresponding to the rest position of the connector, where the coupling bushing is clear of the respective frame slot.

In an embodiment, the tapered roller is movable along a selection direction parallel to the direction of maximum extension of the pin, between a contact position, corresponding to the working position of the connector, where the tapered roller is in contact with the tapered wall of the slot, and a detached position, corresponding to the rest position of the connector, where the tapered roller is clear of the tapered wall of the slot.

In an embodiment, the connector comprises a selecting actuator. The selecting actuator is connected to the coupling bushing to move it from the contact position to the detached position and vice versa.

The features of the connector are such as to make it easy to drive and control in that the position of the connector depends on the position of the selecting actuator (which, for example, may depend on the pressure of a cylinder of the selecting actuator).

In an embodiment, the apparatus comprises a diagnosing roller. In an embodiment, the diagnosing roller is freely rotatable about an axis parallel to the direction of the weight force, in order to perform a diagnosis of the vehicle wheel. In another embodiment, the diagnosing roller is freely rotatable about an axis perpendicular to the direction of the weight force, in order to perform a diagnosis of the vehicle wheel. In an embodiment, the roller is adapted to be positioned at an operating position, where the roller is in contact with the tyre tread, and a disengaged position, where the roller is clear of the tyre. In an embodiment, the apparatus comprises at least one force sensor for measuring the forces acting between the roller and the tyre when the roller is at the operating position.

In an embodiment, the apparatus comprises a contactless measurement sensor, configured to measure at least one dimensional parameter of the wheel. In an embodiment, the contactless measurement sensor is an optical sensor (for example, a laser sensor) In an embodiment, the contactless measurement sensor is a laser triangulator.

The apparatus comprises a sensor or measuring the angular position of the shaft. In an embodiment, the apparatus comprises a device for detecting or determining the balancing planes. The balancing planes are planes perpendicular to the axis of rotation of the wheel and intersecting the interior of the rim on which the wheel balancing weights must be positioned.

In an embodiment, the apparatus comprises a user interface unit. In an embodiment, the interface unit includes a display and/or a mechanical control section (for example, pushbuttons, joystick, etc.). In a different embodiment, the interface unit is a touch screen.

In an embodiment, the apparatus comprises a plurality of dimensional sensors configured to measure the geometry of the wheel and to send corresponding measurement signals to the control unit.

In an embodiment, the apparatus comprises a lift. The lift comprises a platform. The lift is movable from a loading position, where the platform is disposed in proximity to the floor, and an unloading position, where the platform is raised off the floor to allow the wheel to be mounted easily on the shaft.

In an embodiment, the platform is disposed, relative to the frame of the apparatus, on the side which the shaft faces when its axis is in the horizontal position.

According to one aspect of it, this disclosure provides a wheel service method for a vehicle wheel including a tyre mounted on a rim.

In an embodiment, the method comprises a step of moving a plurality of working tools for mounting and demounting the tyre relative to the rim. The method comprises a step of connecting the vehicle wheel to one end of a shaft.

In an embodiment, the method comprises a step of rotating the shaft about a longitudinal axis by means of an actuator.

The method comprises a step of measuring with a measuring system the vibrations of the shaft produced by imbalances of the wheel by effect of the rotation of the shaft itself. In an embodiment, the method comprises a step of generating vibration signals representing the vibrations of the shaft. The method comprises a step of receiving the vibration signals in a control unit.

In an embodiment, the method comprises a step of moving a support device between an activated position, where the support device encircles the shaft while still allowing it to rotate, and a deactivated position, where the support device is spaced from the shaft.

In an embodiment, the method comprises a step of moving a connector between a working position, where the connector mechanically connects the measuring system to a frame, and a rest position, where the measuring system is mechanically disengaged from the frame.

In an embodiment, the method comprises a step of automatically controlling the position of the support device and connector. In this step, the control unit moves the support device to the activated position when the connector is at the rest position. In this step, the control unit moves the support device to the deactivated position when the connector is at the working position.

In an embodiment, the method comprises a step of reconfiguring. In the step of reconfiguring, a reconfiguring actuator moves the shaft from a first operating configuration, where the shaft is perpendicular to the direction of the weight force, to a second operating configuration, where the shaft is parallel to the direction of the weight force.

In an embodiment, the method comprises a step of detecting the position of the support device and connector.

In an embodiment, the method comprises a step of engaging, in which a clutch system moves a clutch element to an engagement position, where the clutch element meshes with a gear on the shaft and a gear of a rotary actuator.

In an embodiment, the method comprises a step of supporting, in which a support device supports the shaft during mounting/demounting operations.

In an embodiment, the method comprises a step of measuring, in which a plurality of dimensional sensors measure the geometry of the wheel and send corresponding measurement signals to the control unit. In an embodiment, the step of measuring is performed by laser trianguiators.

In an embodiment, the method comprises a step of detecting the angular position of the shaft.

In an embodiment, the method comprises a step of detecting or determining the balancing planes, that is, those planes which are perpendicular to the axis of rotation of the wheel and intersect the interior of the rim on which the wheel balancing weights are positioned.

In an embodiment, the method comprises a step of processing in a control unit the vibration signals and the angular positions of the shaft.

In an embodiment, the method comprises a step of displaying the values of the balancing weights to be applied on the wheel and their angular application positions on the inside of the rim.

These and other features will become more apparent from the following detailed description of a preferred, non-limiting embodiment, illustrated by way of example in the accompanying drawings.

BRIEF DESCRIPTION OF THE DRAWINGS

FIGS. 4A and 48 are cross sections of the apparatus di FIG. 1A and of the apparatus of FIG. 1B, respectively;

DETAILED DESCRIPTION

Figure 1A:
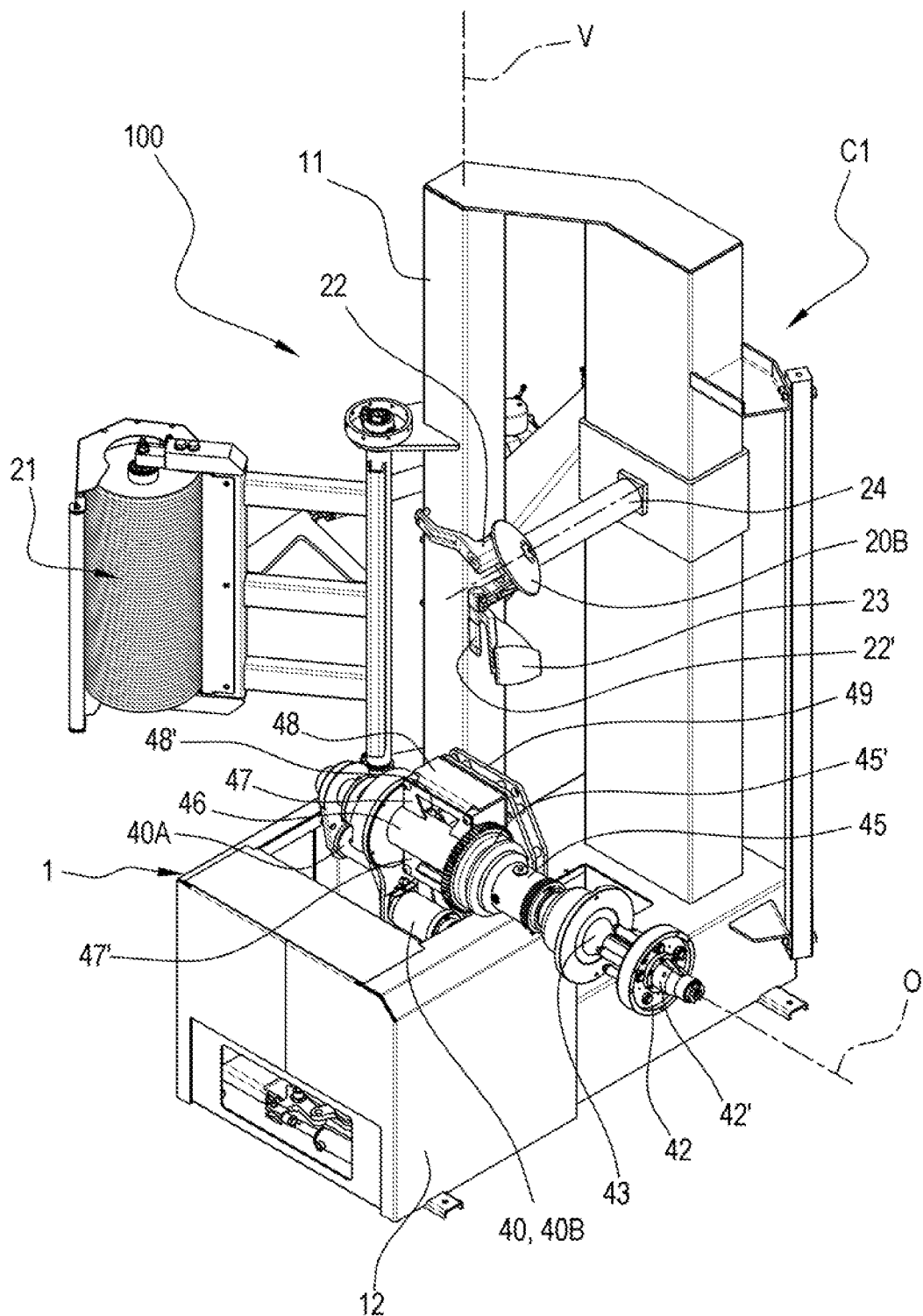
FIGS. 1A and 1B are perspective views schematically illustrating a wheel service apparatus in a first and second configuration, respectively.
Figure 1B:
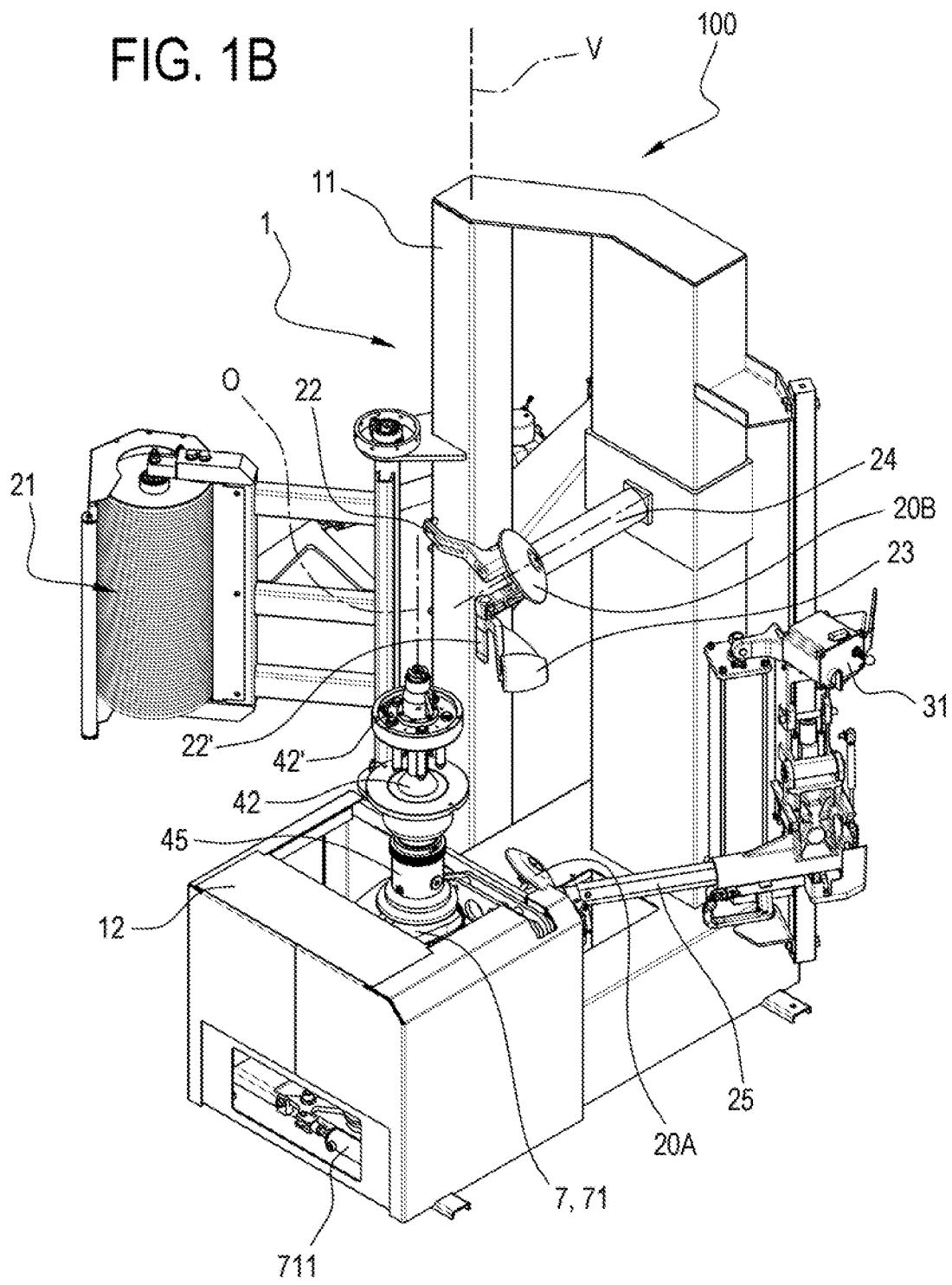
Figure 2A:
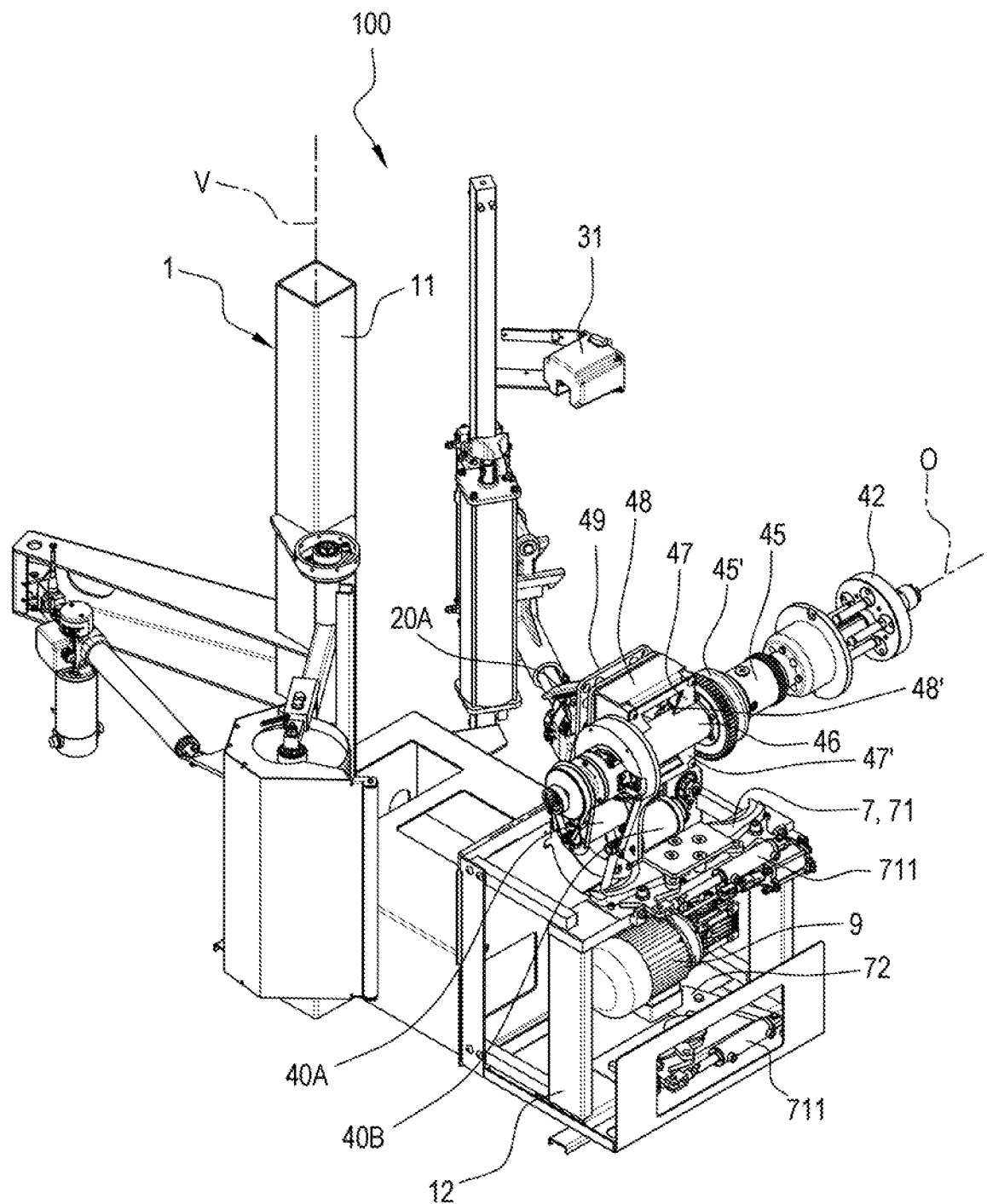
FIGS. 2A and 2B are further perspective views schematically illustrating a variant embodiment of the apparatus of FIGS. 1A and 1B, respectively.
Figure 2B:
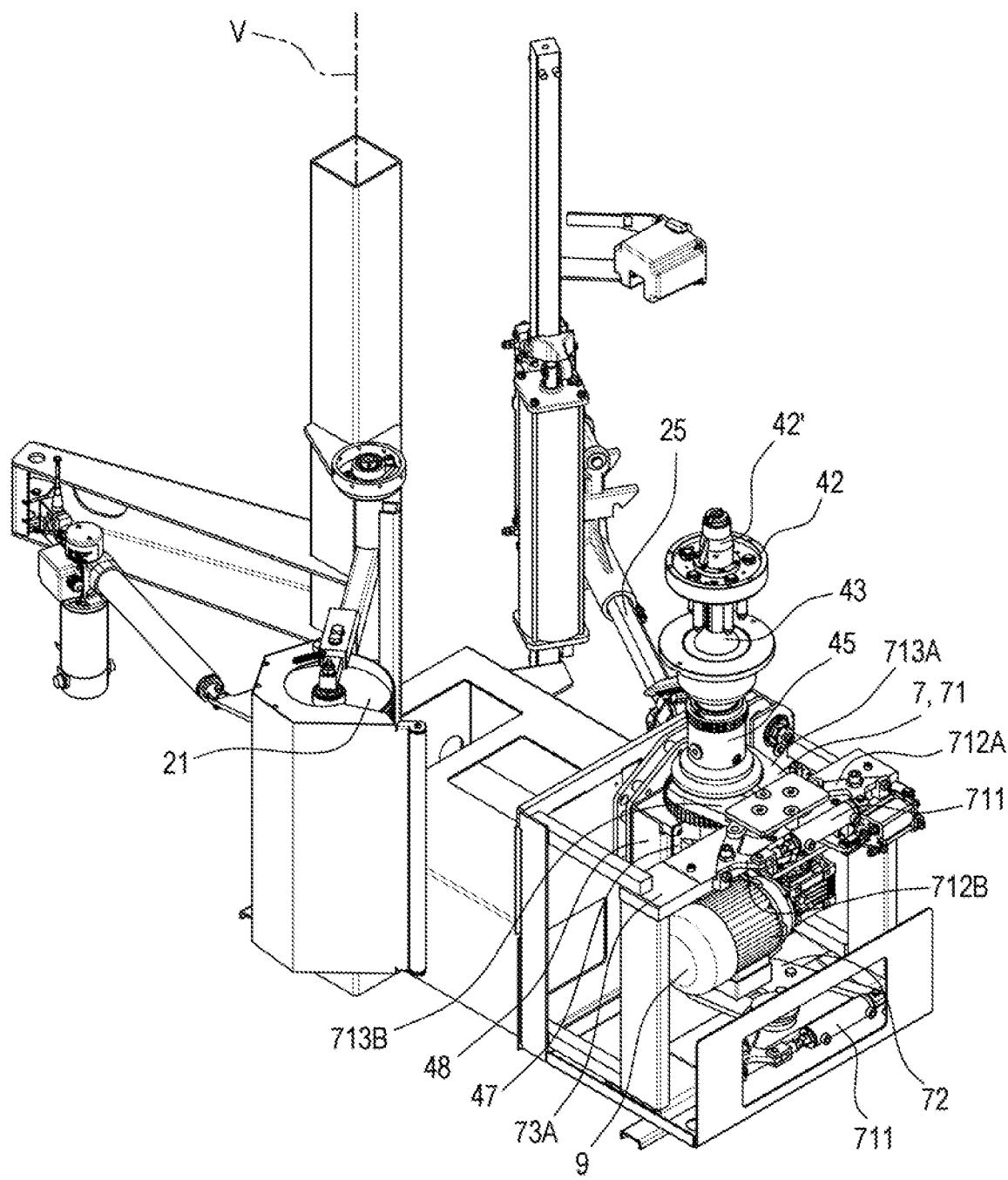
Figure 3A:
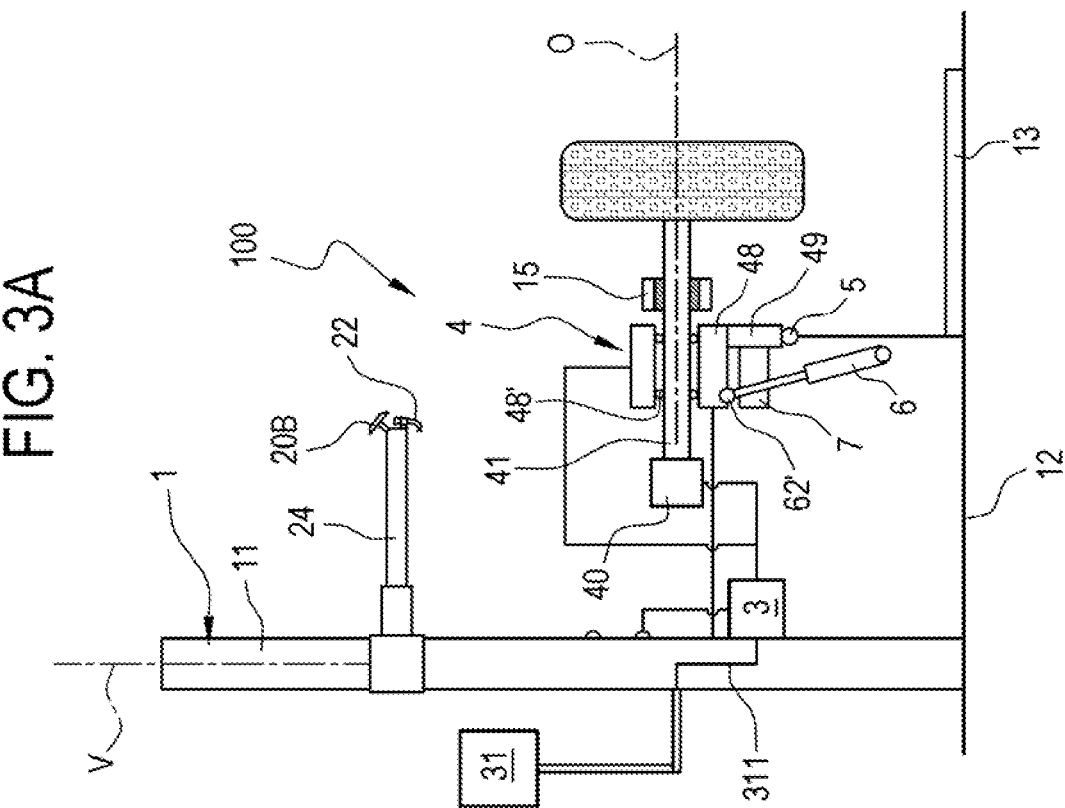
FIGS. 3A and 3B schematically illustrate a further variant embodiment of he apparatus of FIGS. 1A and 1B, respectively.
Figure 3B:
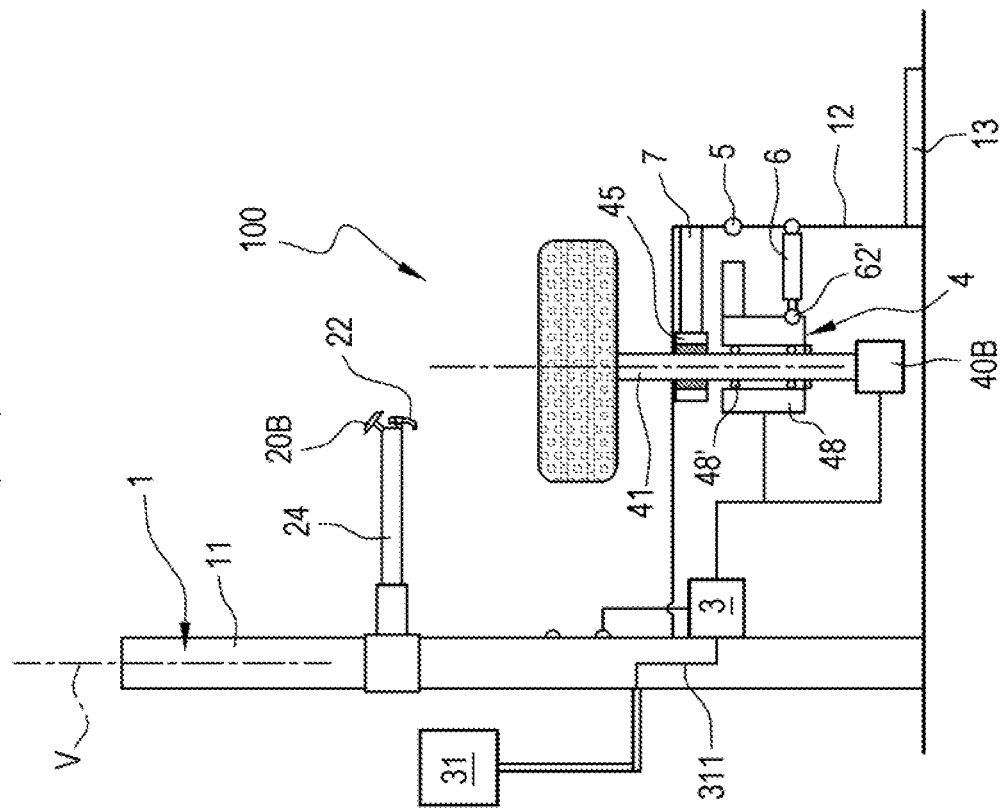
Figure 4A:
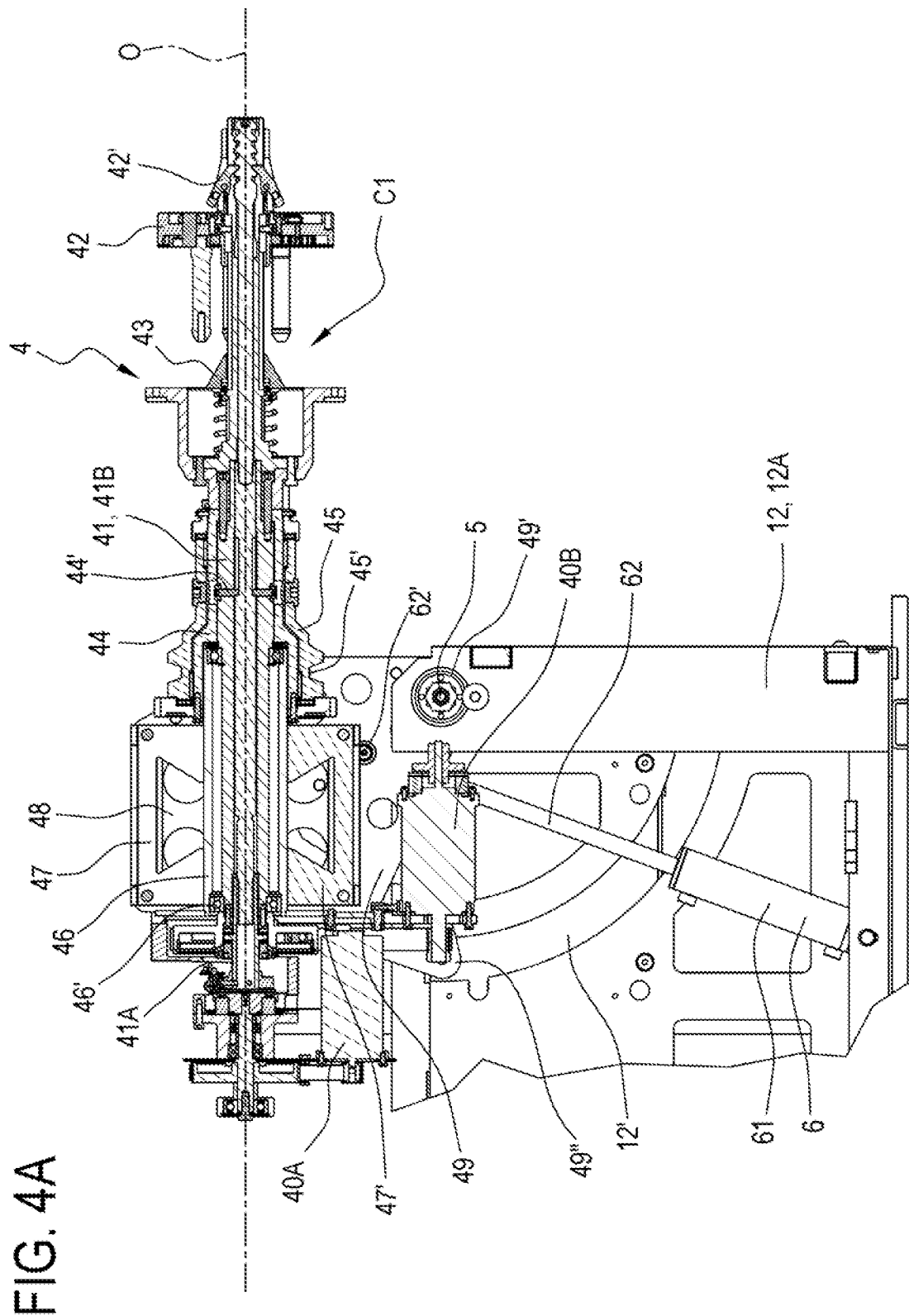
Figure 4B:
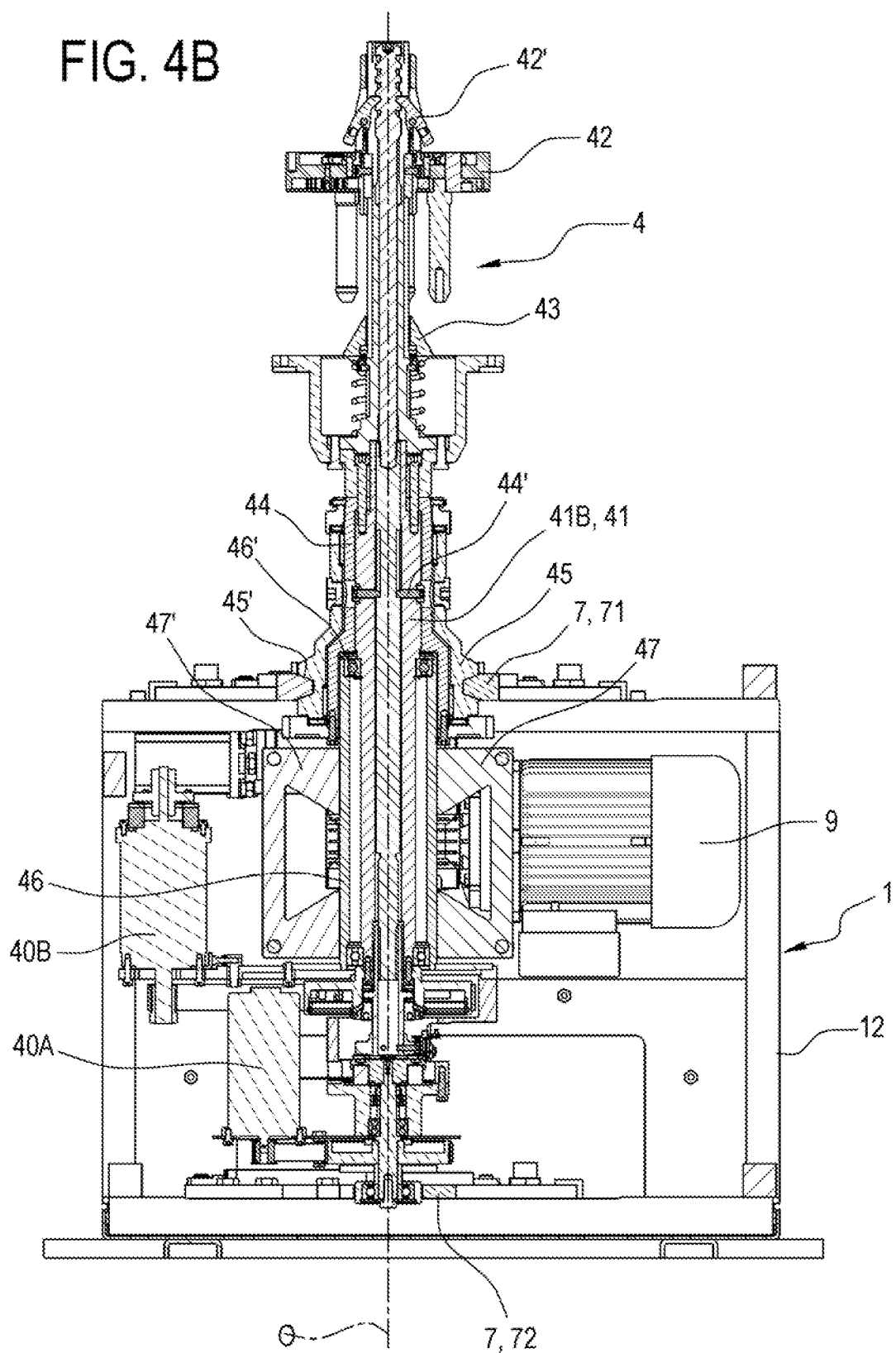
Figure 5B:
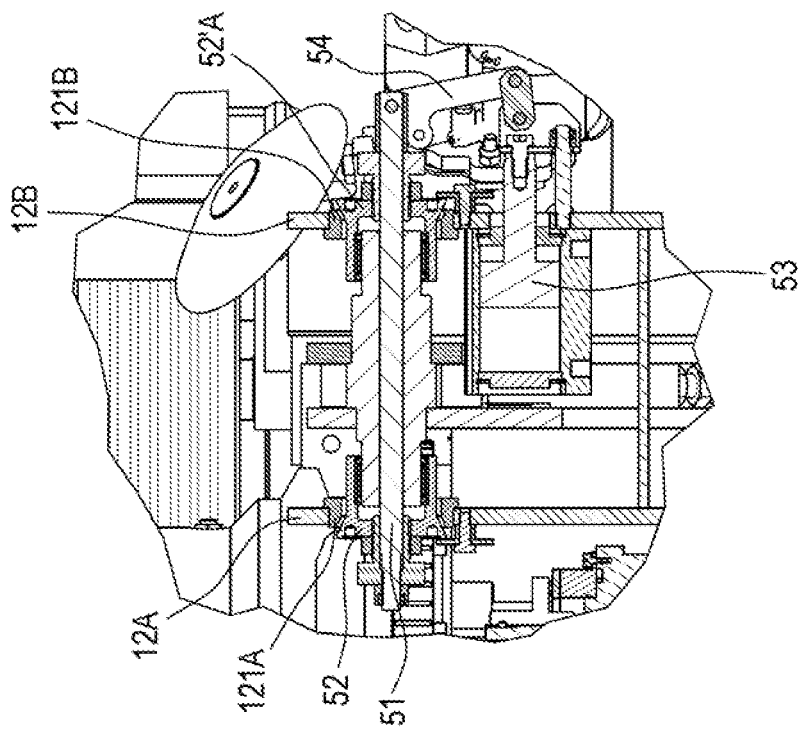
FIGS. 5A and 5B are cross sections of connector of the apparatus with the connector at a working position and at a rest position, respectively.
Figure 5A:
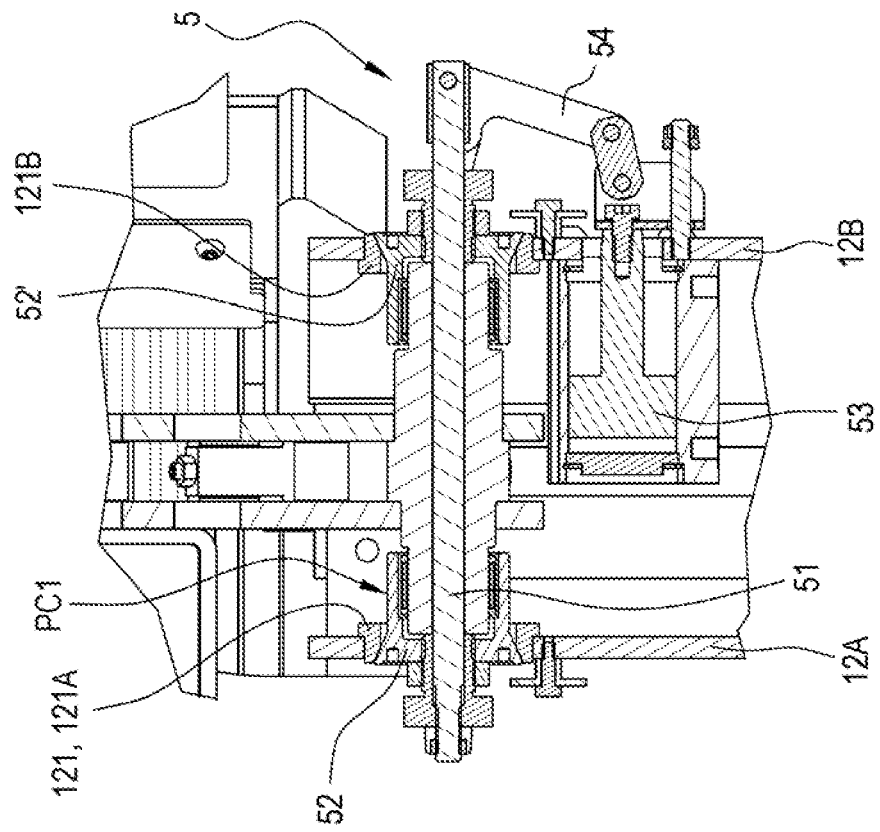
Figure 7:
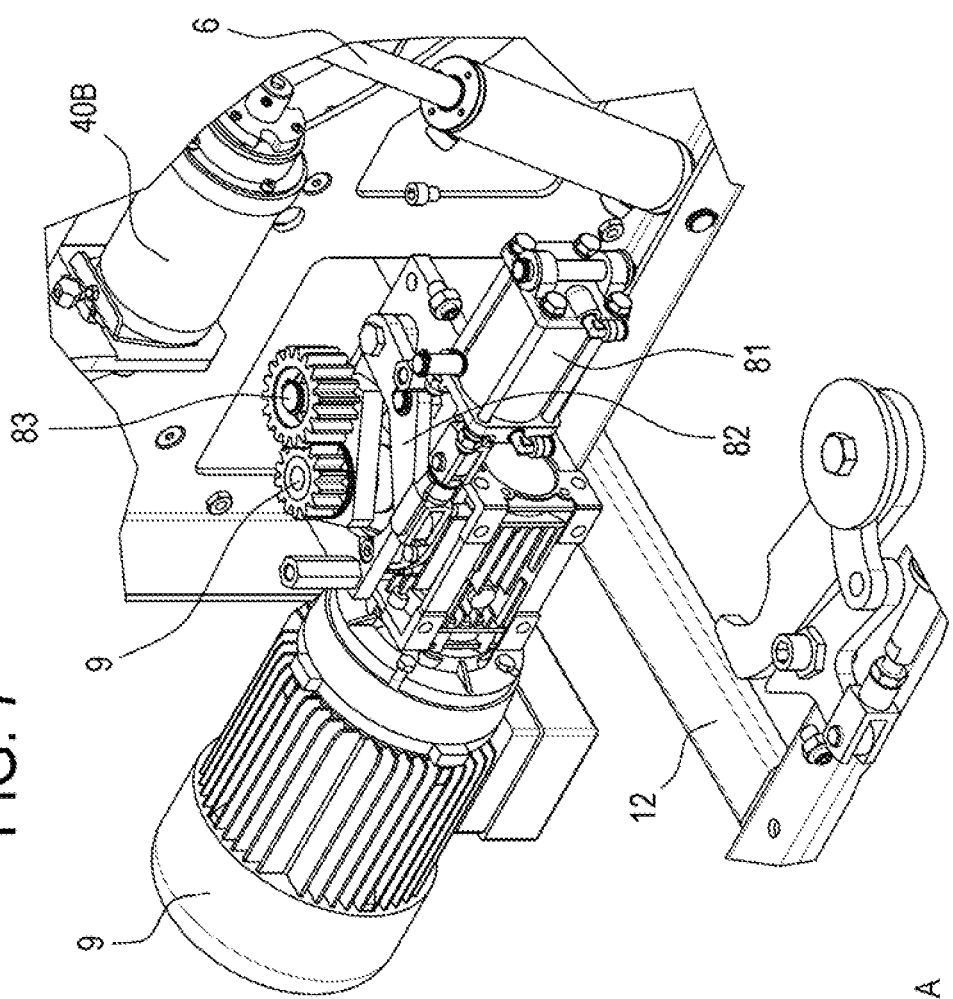
FIG. 7 is a perspective view of a clutch system of the apparatus of FIGS. 1A and 1B.
Figure 6:
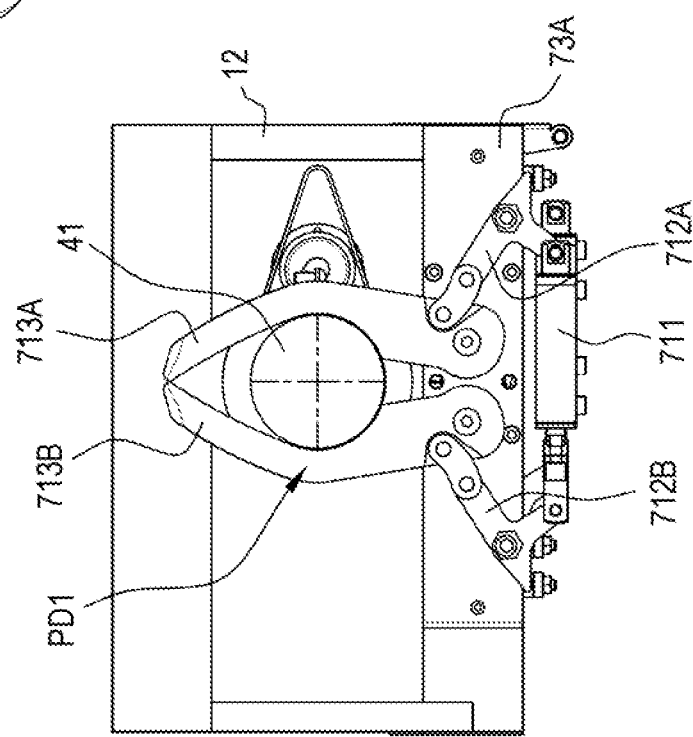
FIG. 6 is a plan view of a support device of the apparatus of FIGS. 1A and 1B.

With reference to the accompanying drawings, the numeral 100 denotes a wheel service apparatus for a vehicle wheel including a tyre mounted on a rim. The apparatus 100 comprises a frame 1. The frame 1 is configured to support components of the apparatus 100 and to discharge the forces deriving from the operations which the apparatus 100 carries out on the wheel. In an embodiment, the frame 1 comprises a support structure 11. In an embodiment, the frame 1 comprises a containing structure 12. The support structure 11 is connected to the containing structure 12.

The apparatus 100 comprises a plurality of tools. The plurality of tools is configured to perform operations for mounting and demounting the tyre relative to the wheel rim and/or for diagnosing the wheel. In an embodiment, the plurality of tools is movable along the support structure 11 between an activated position, in which the tools of the plurality are in contact with the wheel, and a deactivated position, in which the tools of the plurality are clear of the wheel.

In an embodiment, the plurality of tools comprises at least one bead breaker tool, which may be positioned above or below the wheel and may be translated in the vertical direction. In an embodiment, the plurality of tools comprises a first bead breaker tool 20A, configured to press the sidewall of the tyre to allow detaching the tyre from the rim. The first bead breaker tool 20A may be positioned above or below the wheel and may be translated in the vertical direction.

In an embodiment, the plurality of tools comprises a second bead breaker tool 20B, configured to press the sidewall of the tyre to allow detaching the tyre from the rim. The second bead breaker tool 20B is positioned above the wheel in the vertical direction.

In an embodiment, the plurality of tools comprises a demounting tool 22, configured to be inserted between the tyre and the rim in a step of demounting the tyre from the rim.

In an embodiment, the plurality of tools comprises a mounting tool 22', configured to be inserted between the tyre and the rim in the step of mounting the tyre on the rim.

In an embodiment, the plurality of tools comprises a bead pressing tool 23, configured to facilitate operations for mounting the tyre on the rim.

In an embodiment, the apparatus 100 comprises a first operating arm 24, configured to hold one or more of the tools of the plurality. In an embodiment, the apparatus 100 comprises a second operating arm 25, configured to hold one or more of the tools of the plurality. In an embodiment, the first operating arm 24 is movable along the vertical direction, remaining above the wheel in the vertical direction. In an embodiment, the second operating arm 25 is movable along the vertical direction, remaining below the wheel in the vertical direction.

It should be noted that the configuration shown in FIG. 1A, in which the demounting tool 22, the mounting tool 22', the second bead breaker tool 20B and the bead pressing tool 23 are mounted on the first operating arm in combination, is just one example of an embodiment. Each tool of the plurality of tools may be mounted individually on the respective operating arm or in combination with one or more of the other tools.

In an embodiment, the apparatus 100 comprises a diagnosing roller 21, configured to perform a diagnosis of the wheel. The diagnosing roller 21 is configured to rotate freely about its axis of rotation, which is parallel to the direction of the weight force.

In one embodiment, the support structure 11 extends mainly in a vertical direction, parallel to the longitudinal direction of the weight force and the plurality of tools is movable in the vertical direction V. In other embodiments, the support structure 11 extends mainly in a horizontal direction O, perpendicular to the longitudinal direction of the weight force and the plurality of tools is movable in the horizontal direction.

In an embodiment, the frame 1 comprises a lift 13. The lift 13 is configured to make it easier for the wheel to be clamped to the apparatus 100. More specifically, the lift 13 comprises a platform on which the wheel is rested during lifting. The lift 13 is movable between a loading position, where it is substantially in contact with the floor in order to receive the wheel, and an unloading position, where the lift 13 is raised off the floor to allow the wheel to be clamped on.

In an embodiment, the frame 1 comprises a safety cover. The safety cover is movable between a working position, where it surrounds the wheel at least partly, and a rest position, where it is clear of the wheel to allow a user to access the wheel (for example, to engage it, disengage it or apply the balancing weights).

In an embodiment, the apparatus 100 comprises a control unit 3, configured to control the operation of the components of the apparatus 100. In an embodiment, the apparatus 100 comprises a user interface 31, configured to allow a user to enter working data 311. The user interface 31 is connected to the control unit 3 to send the working data 311 to it. The control unit is also configured to allow the results of balancing operations to be displayed.

In an embodiment, the apparatus 100 comprises an operating unit 4. The operating unit 4 is configured to engage the wheel and set it in rotation according to parameters that depend on the type of service to be carried out on the wheel.

The operating unit 4 comprises a drive shaft 41 (also referred to simply as shaft). In an embodiment, the operating unit comprises a first rotary actuator 40A. In an embodiment, the operating unit comprises a second rotary actuator 40B.

In an embodiment, the shaft 41 comprises a first portion 41A. The first portion 41A of the shaft 41 is connected to the first rotary actuator 40A. In an embodiment, the first portion 41A of the shaft is connected to the first rotary actuator 40A by a belt connection. In an embodiment, the shaft 41 comprises a second portion 41B. The second portion 41B of the shaft 41 is connected to the second rotary actuator 40B. In an embodiment, the second portion 41B of the shaft is connected to the second rotary actuator 40B by a belt connection.

The first portion 41A of the shaft 41 is connected to the second portion 41B by a coupling profile. In an embodiment, the coupling profile is, by way of non-limiting example, a female trapezoidal screw.

The second portion 41B of the shaft 41 is connected to the first portion 41A by a coupling profile, in an embodiment, the coupling profile is, by way of non-limiting example, a male trapezoidal screw. In an embodiment, the male trapezoidal screw of the second portion 41B is engaged in the female trapezoidal screw of the first portion 41A of the shaft 41.

The male-female trapezoidal screw coupling allows converting the rotational movement into an axial movement of the second portion 41B of the shaft 41.

In an embodiment, the axial movement of the second portion 41B of the shaft 41 allows tightening the locking flange on the wheel to hold it in place so that the required operations can be carried out.

Thus, in an embodiment, the first rotary actuator 40A is configured to rotate the first portion 41A of the shaft 41, which, through the trapezoidal screw, is configured to produce an axial movement of the second portion 418 of the shaft 41.

Thanks to the axial movement of the second portion 41B, the locking flange is movable between an engaged position, where the wheel is locked to the shaft 41 and a released position, where the wheel is disengaged from the shaft 41.

In an embodiment, the operating unit 4 comprises a clutch. Preferably, the clutch is an electromagnetic clutch. The electromagnetic clutch allows engaging the first actuator 40A in a step of clamping the wheel and disengaging it in a step of balancing the wheel, where the shaft 41 is moved by the second actuator 40B (also known as starter motor).

In an embodiment, the operating unit 4 comprises a locking flange 42. In an embodiment, the operating unit 4 comprises a rear cone 43. The locking flange 42 allows locking wheels of different sizes, while keeping them optimally centred. The locking flange 42 comprises a universal selector 42'. The universal selector 42' comprises a plurality of pawls. In an embodiment, the second portion 41B of the shaft 41 comprises, at a second end of it, a grooved pin 41' configured to engage the pawls of the universal selector 42'.

In an embodiment, the operating unit comprises a first bushing 44. The first bushing 44 is keyed to the shaft 41 (to the second portion 41B of the shaft 41) and rotates as one with the shaft 41.

In an embodiment, the first bushing 44 comprises a plurality of holes in which coupling elements 44' are fanned. The coupling elements 44' are movable in a radial direction perpendicular to an axis of the shaft. More specifically, in an embodiment (commonly known to those skilled in the art as ball plunger press fit), the coupling elements 44' are pushed outwards by a spring.

In an embodiment, the operating unit 4 comprises a second bushing 45. The second bushing 45 surrounds the shaft 41 (the second portion 418 of the shaft 41). The second bushing 45 at least partly surrounds the first bushing 44. The second bushing 45 is connected to the first bushing by the coupling elements 44', which grip the inside surface of the second bushing 45 thanks to the force imparted to them by the spring. As long as the inertia of the second bushing 45 is less than the frictional force of the coupling elements 44' (directly proportional to the force of the spring), the second bushing 45 rotates as one with the first bushing 44 and with the shaft 41. In an embodiment, the second bushing 45 comprises a clamping groove 45'.

In an embodiment, the operating unit 4 comprises a measuring bushing 46. The measuring bushing 46 surrounds the shaft 41 (the second portion 41B of the shaft 41). In an embodiment, the measuring bushing 46 is connected to the shaft 41 (the second portion 41B of the shaft 41) by at least one radial bearing 46'. The measuring bushing 46 is therefore fixed to the frame 1 (to the containing structure 12 of the frame 1) when the shaft 41 is in rotation. That way, the measuring bushing 46 receives the radial stresses due to imbalance of the rotating wheel but no drive torque is transmitted to it.

In an embodiment, the operating unit 4 comprises a vibrating element 47. The vibrating element 47 is configured to vibrate in response to stresses due to wheel imbalance, if any, when the wheel is set in rotation.

In an embodiment, the operating unit 4 comprises a measuring system 48. The measuring system is configured to measure imbalances of the wheel and/or vibrations of the vibrating element 47.

The vibrating element 47 is connected to the measuring bushing 46 to receive the stresses therefrom. In an embodiment, the vibrating element 47 has at least a direction of maximum extension which is perpendicular to a direction of the stresses. In other words, the vibrating element 47 must be very flexible relative to the direction of the stresses to amplify the effect of even the slightest imbalance as much as possible.

In an embodiment, for example, where the axis of the shaft 41 is perpendicular to the direction of the weight force, the vibrating element 47 has at least a direction of maximum extension which is directed along the vertical direction V.

In an embodiment, the vibrating element 47 is a vibrating leaf spring connected to the measuring bushing 46 and to the measuring system 48.

In an embodiment, the operating unit comprises an additional vibrating element 4T which may be, for example, an additional vibrating leaf spring that is also connected to the measuring bushing 46 and to the measuring system 48.

The measuring system comprises a plurality of sensors 48' connected to the measuring bushing 46 to measure its displacements and/or received stresses.

In an embodiment, the operating unit 4 comprises a support structure 49. The support structure 49 is configured to support the operating unit 4 and connect it to the containing structure 12 of the frame 1. In an embodiment, the support structure 49 is connected to the measuring system 48 (for example, but not necessarily, by removable connectors). In an embodiment, the support structure 49 is connected to the containing structure 12 of the frame 1. In an embodiment, the support structure 49 is connected to the containing structure 12 of the frame 1 by a rotary coupling. More specifically, the support structure 49 comprises a slot 49'. In an embodiment, the support structure 49 is connected to the containing structure 12 of the frame 1 by a prismatic coupling. More specifically, the support structure 49 comprises a guide pin 49".

In an embodiment, the containing structure comprises a guide profile 12' along which the guide pin 49" of the support structure 49 slides. In an embodiment, the apparatus 100 comprises a connector 5, engaged in the slot 49' of the support structure 49 to allow the support structure 49 (of the operating unit 4) to rotate around it In an embodiment, the support structure 49 comprises a first plate 49A and a second plate 49B which are parallel and connected to each other. The first plate 49A and the second plate 49B each comprise a respective plurality of holes.

In an embodiment, the operating unit 4 is movable between a first configuration C1 (or balancer configuration C1), where the axis of the shaft 41 is parallel to the horizontal direction O, and a second configuration C2 (or tyre changer configuration C2), where the axis of the shaft 41 is perpendicular to the horizontal direction O. In an embodiment, the operating unit 4 is set to the first configuration C1 to perform wheel balancing. In an embodiment, the operating unit 4 is set to the second configuration C2 to perform mounting and demounting of the tyre relative to the rim. In an embodiment, the apparatus comprises a reconfiguring actuator 6. The reconfiguring actuator is configured to change the operating configuration of the operating unit 4 between the first operating configuration C1 and the second operating configuration C2.

In a purely exemplary embodiment, the reconfiguring actuator is a cylinder and piston assembly 6. It is understood that a person skilled in the art would be able to imagine solutions alternative to the cylinder and piston assembly: for example, a rotary motor provided with a rack and pinion system or a plain rotary actuator suitably connected to the operating unit 4.

In an embodiment, the cylinder and piston assembly 6 comprises a cylinder 61, connected to the containing structure 12. In an embodiment, the cylinder and piston assembly 6 comprises a piston 62, connected to the containing structure 49 of the operating structure 4. In an embodiment, the piston 62 is connected removably (in the sense that the connection can be removed) to the support structure 49 of the operating, unit 4 in a respective clamping slot 62'. The clamping slot 62' is movable between an activated position, where the piston 62 is locked to the support structure 49, and a deactivated position, where the piston 62 is disengaged from the support structure 49.

In an embodiment, the clamping slot 62' is at the activated position when the operating unit 4 is in the first operating configuration C1 and at the deactivated position when the operating unit 4 is in the second operating configuration C2.

In an embodiment, the connector 5 is movable between a working position, where the support structure 49 is locked to the containing structure 12, and a rest position, where the support structure 49 is disengaged from the containing structure 12.

In an embodiment, the connector 5 is at the working position when the operating unit 4 is in the first operating configuration C1 and at the rest position when the operating unit 4 is in the second operating configuration C2.

In an embodiment, the connector 5 comprises a pin 51 that is integral with the support structure 49 of the operating structure 4. The pin 51 passes through a coupling hole 121 in the containing structure 12. In an embodiment, the connector 5 comprises a coupling bushing 52. The coupling bushing 52 is movable in the direction of maximum extension of the pin 51 (along the axis of the pin). The coupling bushing 52 is interposed between the pin 51 and the coupling hole 121 in the containing structure 12. The coupling bushing 52 is movable between an interference position PC1, where it is in contact with an inside surface of the coupling hole 121 and with an outside surface of the pin, and a non-interference position PC2, where the coupling bushing 52 is not in contact with at least one between the inside surface of the coupling hole 121 and the outside surface of the pin 51.

That way, at the interference position PC1, the friction between the pin 51, the coupling bushing 52 and the inside surface of the coupling hole 121 allows transmitting the stresses the support structure 4 is subjected to. At the non-interference position PC2, on the other hand, since the pin 51, the coupling bushing 52 and the inside surface of the coupling hole 121 are disengaged, the stresses are not transmitted.

In an embodiment, the connector 5 comprises a selecting actuator 53. The selecting actuator 53 is connected to the coupling bushing 52 to move it from the interference position PC1 to the non-interference position PC2.

In a preferred embodiment, the containing structure comprises a first wall 12A and a second wall 12B. In a preferred embodiment, the containing structure comprises a first coupling hole 121A and a second coupling hole 121B, each made in the respective first wail 12A and second wall 12B. In an embodiment, the connector 5 comprises an additional coupling bushing 52' that is also movable between a respective interference position PC1 and a respective non-interference position PC2.

In an embodiment, the coupling bushing 52 is disposed between the pin 51 and the first coupling hole 121A. In an embodiment, the additional coupling bushing 52' is disposed between the pin 51 and the second coupling hole 121B.

In an embodiment, the selecting actuator 53 is connected to the coupling bushing 52 and to the additional coupling bushing 52'. In an embodiment, the selecting actuator 51 is a cylinder and piston assembly.

In an embodiment, the coupling bushing 52 and/or the additional coupling bushing 52' have a tapered outside surface. In an embodiment, the first coupling hole 121A and the second coupling hole 121B of the containing structure 12 have a tapered inside surface. That way, displacement of the coupling bushing 52 and/or of the additional coupling bushing 52' along the axis of the pin 51 is converted into a radial thrust which contributes to connecting the pin 51 to the containing structure 12.

In an embodiment, the coupling bushing 52 and the additional coupling bushing 52' are disposed on corresponding outside surfaces of the first wall 12A and of the second wall 12B of the support structure 12. The coupling bush 52 thus moves (to pass from the interference position PC1 to the non-interference position PC2) in the direction opposite to that in which the additional coupling bushing 52' moves.

Thus, in this embodiment, the connector 5 comprises a linkage 54. The linkage 54 comprises a first link 54A, connected to the selecting actuator 53. The linkage 54 comprises a second link 54B, connected to the coupling bushing 52 and to the first link 54A. The linkage 54 comprises a third link 54C, connected to the additional coupling bushing 52' and to the first link 54A. The first link 54A includes a thrust profile at the end of it opposite to that where the selecting actuator 53 is connected. The thrust profile is configured to convert a rotation of the first link 54A into a forward movement of the second link 54B and a backward movement of the third link 54C (the thrust profile is configured to convert a rotation of the first link 54A into movements of the second link 54B and of the third link 54C in opposite directions).

In an embodiment, the apparatus 100 comprises a support device 7. The support device 7 is configured to support the operating unit 4. In an embodiment, the support device 7 is movable between an activated position PD1, where it is in contact with the shaft 41 and a deactivated position PD2, where it is disengaged from the shaft 41. In an embodiment, the support device 7 is in contact with the second bushing 45 when it is at the activated position PD1. In an embodiment, the support device 7 is disengaged from the second bushing 45 when it is at the deactivated position PD2. In an embodiment, the support device 7 is at the deactivated position PD2 when the operating unit 4 is in the first configuration C1. In an embodiment, the support device 7 is at the activated position PD1 when the operating unit 4 is in the second configuration C2.

In an embodiment, the support device 7 comprises a first clamp 71. In an embodiment, the support device 7 comprises a second clamp 72 The term "clamp" is used herein to denote any locking element capable of encircling the shaft 41 and supporting it as it rotates.

In an embodiment, the first clamp 71 is configured to be engaged in the damping groove 45' of the second bushing 45 when the support device 7 is at the activated position PD1.

Described below is the operation of the first clamp 71, it being understood that the features of it described also apply to the second clamp 72.

The first clamp 71 comprises a reciprocating actuator 711. The first clamp 71 comprises a pair of arms 712A 712B. The first clamp 71 comprises a pair of jaws 713A, 713B.

Each arm of the pair of arms 712A and 712B hinged to the containing structure 12 at a respective pivot 712. Each arm of the pair of arms 712A and 712B is connected to a corresponding jaw 713A, 713B and to a respective end of the reciprocating actuator 711. Each jaw of the pair of jaws 713A and 713B is hinged to the containing structure 12 at a respective pivot 713. Each arm of the pair of arms 712A and 712B is configured to rotate when the two ends of the reciprocating actuator 711 move apart. Each jaw of the pair of jaws 713A and 713B is configured to rotate in response to the rotation of the respective arm 712A, 712B.

In an embodiment, the apparatus 100 (the containing structure 12) comprises a first support beam 73A. In an embodiment, the apparatus 100 (the containing structure 12) comprises a second support beam 73B. In an embodiment, the shaft 41 is disposed at a position intermediate between the first support beam 73A and the second support beam 73B. More specifically, in an embodiment, the pair of jaws 713A, 713B of the first clamp 71 rests on the first support beam 73A and on the second support beam 73B in such a way as to reduce the flexural strain caused by the high stresses of mounting and demounting operations.

In an embodiment, when the operating unit 4 is in the first configuration C1, the support device 7 is at the deactivated position PD2 and the connector 5 at the working position PC1. In an embodiment, when the operating unit 4 is in the second configuration C2, the support device 7 is at the activated position PD1 and the connector 5 at the rest position PC2.

In an embodiment, the apparatus 100 comprises a clutch system 8. In an embodiment, the apparatus 100 comprises a third rotary actuator 9. In an embodiment, the second rotary actuator 40B transmits power at high rotation speeds and reduced drive torques. In an embodiment, the third, rotary actuator 9 transmits power at low speeds and high drive torques. Thus, the first rotary actuator 40A and the second rotary actuator 40B are configured to drive the shaft 41 when the operating unit 4 is in the first configuration C1. The third rotary actuator 9, on the other hand, is configured to drive the shaft 41 when the operating unit 4 is in the second configuration C2.

In an embodiment, the first rotary actuator 40A and the second rotary actuator 40B belong to the operating unit 4 and are movable therewith. In other embodiments, the first rotary actuator 40A and the second rotary actuator 40B are fixedly mounted on the containing structure 12 of the frame 1.

In an embodiment, the dutch system 8 is configured to connect the shaft 41 to the third rotary actuator 9, when the operating unit 4 is in the second configuration C2.

In an embodiment, the dutch system 8 is configured to selectively connect the shaft 41 to the third rotary actuator 9.

In an embodiment, the dutch system 8 comprises one or more of the following components:
a dutch actuator 81;
a plurality of levers 82, connected to the dutch actuator 81;
a dutch element 83, connected to at least one lever of the plurality 82.

In an embodiment, with the operating unit 4 in the second configuration C2, the dutch actuator is configured to move the plurality of levers 82. The plurality of levers 82 is configured to move the dutch element 83 to a clutch position, where the dutch element is in contact with a shaft of the third rotary actuator 9 (or in other embodiments, of the first rotary actuator 40A or the second rotary actuator 40B) and with the shaft 41. More specifically, the dutch element is configured to engage a toothed wheel (or any element capable of receiving the drive power) keyed to the shaft 41.

In an embodiment, the apparatus comprises a plurality of dimensional sensors. In an embodiment, the plurality of dimensional sensors is disposed on the containing structure 12. The plurality of dimensional sensors is configured to scan the wheel and to automatically send to the control unit 3 the dimensions of the wheel, essential for balancing the wheels.

In an embodiment, the plurality of sensors 48' is connected to the control unit 3 to send to the latter the vibration signals representing vibrations of the vibrating element 47, which vibrates as a function of the imbalance of the shaft 41 when the wheel is set in rotation.

In an embodiment, the connector 5 (the selecting actuator 53) is connected to the control unit 3 to send to the latter a first position signal, representing the position of the connector 5.

In an embodiment, the support device 7 is connected to the control unit 3 to send to the latter a second position signal, representing the position of the connector 5.

In an embodiment, the control unit is configured to send to the support device 7 and/or to the connector 5 the drive signals by which the control unit 3 controls the position of the support device 7 and/or of the connector 5.

More specifically, in an embodiment, the control unit is configured to position the connector 5 at the working position when the support device 7 is at the deactivated position. In an embodiment, the control unit is configured to position the support device 7 at the activated position when the connector 5 is at the rest position.

In an embodiment, the cylinder and piston assembly 6 is connected to the control unit 3 to send to the latter a third position signal, representing the position of the cylinder and piston assembly 6. In an embodiment, the control unit 3 is configured to send to the cylinder and piston assembly 6 drive signals by which the control unit 3 controls the position of the cylinder and piston assembly 6.

In an embodiment, the control unit 3 is configured to position the clamping slot 62' of the cylinder and piston assembly 6 at the activated position when the support device 7 is at the deactivated position. In an embodiment, the control unit 3 is configured to position the clamping slot 62' of the cylinder and piston assembly 6 at the deactivated position when the support device 7 is at the activated position.

In an embodiment, the control unit 3 is configured to control the position of the connector 5, of the support device 7 and of the cylinder and piston assembly 6 as a function of the working data 311. In an embodiment, the control unit 3 is configured to control a rotation speed of the shaft 41 (as a function of the working data 311). In an embodiment, the control unit 3 is configured to control the clutch system 8 (as function of the working data 311).

In an embodiment, the control unit is configured to control and drive the plurality of tools (as a function of the working data 311).

According to one aspect of it, this disclosure provides a wheel service method for a vehicle wheel including a tyre mounted on a rim.

The method comprises a step of preparing a wheel service apparatus 100.

In an embodiment, the method comprises a step of moving a plurality of tools used for mounting and demounting the tyre relative to the nm. More specifically, in the step of moving, the plurality of tools slides on a support structure 11 between a working position, where the plurality of tools is in contact with the wheel, and a rest position, where the plurality of tools is clear of the wheel.

In an embodiment, the method comprises a step of connecting the vehicle wheel to a first end of a shaft 41. More specifically, in this step of connecting, a locking flange 42, including a universal selector 42', clamps and centres a wheel to lock it to the shaft 41.

The method comprises a step of rotating the shaft 41 about a longitudinal axis by means of an actuator. In an embodiment, the shaft 41 is set in rotation by a first rotary actuator 40A and/or a second rotary actuator 40B and/or a third rotary actuator 9. In an embodiment, the step of rotating the shaft 41 comprises a first and a second step of rotating. In the first step of rotating, the second rotary actuator 40B sets the shaft in rotation at high speeds and low drive torques. In the second step of rotating, the third rotary actuator 9 sets the shaft in rotation at low speeds and high drive torques.

In an embodiment, the method comprises a step of clamping the wheel. In the step of clamping, a first portion 41A of the shaft 41 slides axially relative to a second portion 41B of the shaft 41 to move the locking flange axially. More specifically, moving the locking flange towards the shaft 41 allows locking the wheel to the shaft, whilst moving the locking flange away from the shaft 41 allows disengaging the wheel from the shaft.

In an embodiment, the method comprises a step of engaging, where a clutch system 8 mechanically connects the third rotary actuator 9 to the shaft 41. In the step of engaging, a plurality of levers 82 moves a clutch element 83 to a position where it is in contact with the shaft 41 and with the third rotary actuator 9.

In an embodiment, the method comprises a step of measuring with a measuring system 48 the vibrations of the shaft 41 produced by imbalances of the wheel by effect of the rotation of the shaft 41 itself.

In the step of measuring the vibrations, a measuring bushing 46 surrounds the shaft 41, is connected thereto by at least one radial bearing 46' and is subjected to the same stresses as the shaft 41. In the step of measuring the vibrations, the measuring bushing 46 transmits the stresses received to a vibrating element 47 connected to the measuring system 48. The measuring system 48 measures the vibrations of the vibrating element 47 and sends them to a control unit 3 which uses them to calculate wheel imbalances. The method comprises a step of generating vibration signals representing the vibrations of the shaft 41 (of the vibrating element 47). The method comprises a step of receiving the vibration signals in the control unit 3.

In an embodiment, the method comprises a step of moving a support device 7 between an activated position PD1, where the support device 7 encircles the shaft 41 while still allowing it to rotate, and a deactivated position PD2, where the support device 7 is spaced from the shaft 41.

In an embodiment, the step of moving the support device 7 comprises a step of opening and/or closing a first clamp 71 and/or a second clamp 72. More specifically, in the step of opening the first clamp 71, a pair of arms 712A, 712B moves a pair of jaws 713A, 713B in such a way as to clamp the shaft 41.

In an embodiment, the step of moving the support device 7 comprises a step of supporting the support device 7. More specifically, in the step of moving the support device 7, a first support beam 73A and a second support beam 73B support the first clamp 71 on opposite sides of the shaft 41.

In an embodiment, the method comprises a step of moving a connector 5 between a working position, where the connector 5 mechanically connects the measuring system 48 (the shaft 41 and/or the operating unit 4) to a frame 1, and a rest position, where the measuring system 48 (the shaft 41 and/or the operating unit 4) is mechanically disengaged from the frame 1.

In an embodiment, the step of moving the connector 5 comprises a step of moving a coupling bushing 52, which slides along a pin 51 between an interference position PC1, where the coupling bushing is in contact with the frame 1 and with the pin 51, and a non-interference position PC2, where the coupling bushing is in contact only with the pin 51, preventing the transmission of radial strain between the pin 51 and the frame 1. In an embodiment, the method comprises a step of moving an additional coupling bushing 52'.

In an embodiment, the method comprises a step of connecting. In the step of connecting, a reconfiguring actuator 6 is connected to the measuring system 48 and/or to the shaft 41 by a clamping slot 62' disposed at the activated position.

In an embodiment, the method comprises a step of disconnecting. In the step of disconnecting, the measuring system 48 and/or the shaft 41 are disconnected from the reconfiguring actuator 6 by the clamping slot 62', which is disposed at the deactivated position.

In an embodiment, the method comprises a step of detecting the position of the support device 7 and/or of the connector 5 and/or of the clamping slot 62'.

In an embodiment, the method comprises a step of automatically controlling the position of the support device 7 and/or of the connector 5 and/or of the clamping slot 62'. In an embodiment, in the step of automatically controlling, the control unit moves the support device 7 to the activated position when the connector 5 is at the rest position. In an embodiment, in the step of automatically controlling, the control unit moves the support device 7 to the activated position when the connector 5 is at the rest position and the clamping slot 62' is at the deactivated position. In an embodiment, in the step of automatically controlling, the control unit moves the support device 7 to the deactivated position when the connector is at the working position. In an embodiment, in the step of automatically controlling, the control unit moves the support device 7 to the deactivated position when the connector is at the working position and the clamping slot 62' is at the activated position.

In an embodiment, the method comprises a step of reconfiguring, where the reconfiguring actuator 6 (a cylinder and piston assembly 6) moves the shaft 41 from a first operating configuration C1, where the shaft 41 is perpendicular to the direction of the weight force, to a second operating configuration C2, where the shaft 41 is parallel to the direction of the weight force.

In an embodiment, the method comprises a step of reconfiguring, where the reconfiguring actuator 6 (a cylinder and piston assembly 6) moves an operating unit 4 (including the shaft 41 and/or the measuring system 48 and/or the first rotary actuator 40A and/or the second rotary actuator 408) from a first operating configuration C1, where the shaft 41 is perpendicular to the direction of the weight force, to a second operating configuration C2, where the shaft 41 is parallel to the direction of the weight force.

The invention claimed is:

1. A wheel service apparatus for a vehicle wheel including a tyre mounted on a rim, wherein the apparatus comprises:
   a frame:
   a plurality of working tools, connected to the frame and movable to perform operations for mounting and demounting the tyre relative to the rim;
   a shaft which rotates about a longitudinal axis and which is configured to be connected, at a first end of it, to the rim of the vehicle wheel;
   an actuator, operatively connected to the shaft to set it in rotation;
   a measuring system, configured to generate vibration signals representing vibrations of the shaft produced by imbalances of the wheel by effect of the rotation of the shaft itself;
   a control unit connected to the measuring system to receive the vibration signals;
   a support device, connected to the frame and movable between an activated position, where it encircles the shaft while still allowing it to rotate, and a deactivated position, where it is spaced from the shaft;
   a connector, movable between a working position, where it mechanically connects the measuring system to the frame, and a rest position, where the measuring system is mechanically disengaged from the frame.

2. The apparatus according to claim 1, wherein the control unit is configured to receive a command for activating a tyre changer configuration, to instruct the support device to move to its activated position, and to instruct the connector to move to its rest position in response to receiving the command to activate the tyre changer configuration.

3. The apparatus according to claim 1, wherein the control unit is configured to receive a command for activating a balancer configuration, to instruct the support device to move to its deactivated position, and to instruct the connector to move to its working position in response to receiving the command to activate the balancer configuration.

4. The apparatus according to claim 1, wherein the support device comprises:
   a bushing surrounding the shaft;
   a locking device which is connected to the frame;
   wherein the locking device is movable between a rest position, corresponding to the deactivated position of the support device, where it is clear of the bushing, and a working position, corresponding to the activated position of the support device, where it is engaged with the bushing in order to support the shaft.

5. The apparatus according to claim 1, wherein the support device rests on the frame in at least two support zones opposite each other with respect to the longitudinal axis of the shaft to reduce the stresses on the support device.

6. The apparatus according to claim 1, wherein the shaft is movable between a first operating configuration, where its longitudinal axis is perpendicular to a direction of the weight force, and a second operating configuration, where its longitudinal axis is parallel to the direction of the weight force, and
   wherein the apparatus comprises a reconfiguring actuator configured to move the shaft from the first operating configuration to the second operating configuration.

7. The apparatus according to claim 6, wherein, in the first operating configuration, the connector is at the working position and the support device is at the deactivated position, and
   wherein, in the second operating configuration, the connector is at the rest position and the support device is at the activated position.

8. The apparatus according to claim 1, wherein the apparatus comprises an additional actuator, operatively connectable to the shaft to set it in rotation,
   wherein the actuator is configured to provide rotation speeds and drive torques falling within a first range of speeds and a first range of drive torques, respectively, and
   wherein the additional actuator is configured to provide rotation speeds and drive torques falling within a second range of speeds and a second range of drive torques, respectively; a maximum value of the first range of speeds being greater than a maximum value of the second range of speeds and a minimum value of the first range of drive torques being less than a minimum value of the second range of drive torques.

9. The apparatus according to claim 8, comprising a clutch system movable between an activated position, where the shaft is engaged with the additional actuator, and a deactivated position, where the shaft is disengaged from the additional actuator, and wherein, with the connector at the rest position, the clutch system is at the activated position and, with the connector at the working position, the clutch system is at the deactivated position.

10. The apparatus according to claim 1, wherein the connector comprises:
a pin linked to the measuring system;
a tapered roller keyed to the pin and associated with a respective coupling hole of the frame, having a tapered wall, the tapered roller being movable along a selection direction between an interference position, corresponding to the working position of the connector, where the tapered roller is in contact with the tapered wall of the coupling hole, and a non-interference position, corresponding to the rest position of the connector, where the tapered roller is clear of the tapered wall of the coupling hole.

11. The apparatus according to claim 1, wherein the apparatus comprises a diagnosing roller, freely rotatable about an axis parallel to a direction of the weight force and movable between a first position, where the diagnosing roller is in contact with the tyre tread in order to perform a diagnosis of the vehicle wheel, and a second position, where the diagnosing roller is spaced from the wheel.

12. The apparatus according to claim 1, wherein the apparatus comprises a lift, which includes a platform and which is movable from a loading position, where the platform is disposed in proximity to the floor, and an unloading position, where the platform is raised off the floor to allow the wheel to be mounted easily on the shaft.

13. A wheel service method for a vehicle wheel including a tyre mounted on a rim, wherein the method comprises the following steps:
moving a plurality of tools used for mounting and demounting the tyre relative to the rim;
connecting the vehicle wheel to a shaft at a first end of the shaft;
rotating the shaft about a longitudinal axis by means of an actuator;
measuring with a measuring system the vibrations of the shaft produced by imbalances of the wheel by effect of the rotation of the shaft itself;
generating vibration signals representing the vibrations of the shaft;
receiving the vibration signals in a control unit;
moving a support device between an activated position, where the support device encircles the shaft while still allowing it to rotate, and a deactivated position, where the support device is spaced from the shaft;
moving a connector between a working position, where the connector mechanically connects the measuring system to a frame, and a rest position, where the measuring system is mechanically disengaged from the frame.

14. The method according to claim 13, comprising the following steps:
receiving an activation command, representing an operating configuration requested by the user;
processing the activation command and generating corresponding drive signals;
moving the support device to the deactivated position or to the activated position as a function of the drive signals;
moving the connector to the working position or to the rest position as a function of the drive signals.

15. The method according to claim 13, comprising a step of reconfiguring, where a reconfiguring actuator moves the shaft from a first operating configuration, where the longitudinal axis of the shaft is perpendicular to the direction of the weight force, to a second operating configuration, where the shaft is parallel to the direction of the weight force.

16. A wheel service apparatus for a vehicle wheel including a tyre mounted on a rim, wherein the apparatus comprises;
a frame:
a plurality of working tools, connected to the frame and movable to perform operations for mounting and demounting the tyre relative to the rim;
a shaft rotating about a longitudinal axis, the shaft being configured to be connected, at a first end of it, to the rim of the vehicle wheel;
an actuator, operatively connected to the shaft to set the shaft in rotation;
a measuring system, configured to generate vibration signals representing vibrations of the shaft produced by imbalances of the wheel by effect of the rotation of the shaft itself;
a control unit, connected to the measuring system to receive the vibration signals;
a support device, connected to the frame and disposable in an activated position, where the support device is directly or indirectly in contact with the shaft at a supporting region of the shaft, to provide a constrain against radial movements of the shaft, still allowing the shaft to rotate about the longitudinal axis, and in a deactivated position, where it is spaced from the shaft;
a connector, disposable in a working position, where it mechanically connects the measuring system to the frame, and in a rest position, where the measuring system is mechanically disengaged from the frame.

17. The apparatus according to claim 16, wherein the apparatus comprises a bushing surrounding the shaft at the supporting region of the shaft.

18. The apparatus according to claim 17, wherein the support device includes a clamp, the clamp being connected to the frame and movable between a rest position, corresponding to the deactivated position of the support device, where the clamp is dear of the bushing, and a working position, corresponding to the activated position of the support device, where the clamp is engaged with the bushing in order to support the shaft.

19. The apparatus according to claim 16, wherein the control unit is programmed to provide:
a) an automatic setting of the support device in the activated position and to provide an automatic setting of the connector in the rest position, in response to a command to activate a tyre changer configuration for the apparatus, or
b) an automatic setting of the support device in the deactivated position and to provide an automatic setting of the connector in the working position, in response to a command to activate a balancer configuration for the apparatus.

20. The apparatus according to claim 16, wherein the shaft tilts between a first operating configuration, where the longitudinal axis of the shaft is perpendicular to the direction of the weight force, and a second operating configuration, where the longitudinal axis of the shaft is parallel to the direction of the weight force.

* * * * *